(12) United States Patent
Li

(10) Patent No.: US 11,065,983 B2
(45) Date of Patent: Jul. 20, 2021

(54) RAILWAY TRANSPORTATION POWER SUPPLY CONSTRUCTION

(71) Applicants: Southwest Jiaotong University, Chengdu (CN); Qunzhan Li, Chengdu (CN)

(72) Inventor: Qunzhan Li, Chengdu (CN)

(73) Assignees: SOUTHWEST JIAOTONG UNIVERSITY, Chengdu (CN); Qunzhan Li, Chengdu (CN)

( * ) Notice: Subject to any disclaimer, the term of this patent is extended or adjusted under 35 U.S.C. 154(b) by 416 days.

(21) Appl. No.: 16/088,572

(22) PCT Filed: Apr. 6, 2017

(86) PCT No.: PCT/CN2017/079562
§ 371 (c)(1),
(2) Date: Sep. 26, 2018

(87) PCT Pub. No.: WO2017/174001
PCT Pub. Date: Oct. 12, 2017

(65) Prior Publication Data
US 2020/0139848 A1    May 7, 2020

(30) Foreign Application Priority Data
Apr. 7, 2016 (CN) .......................... 201610213944.6

(51) Int. Cl.
*B60M 1/30* (2006.01)
*B60L 5/36* (2006.01)
(52) U.S. Cl.
CPC ............... *B60M 1/305* (2013.01); *B60L 5/36* (2013.01)

(58) Field of Classification Search
CPC ............. B60M 1/30; B60M 1/305; B60L 5/36
See application file for complete search history.

(56) References Cited

U.S. PATENT DOCUMENTS 6,250,442 B1 * 6/2001 Perraud .................... B60M 1/08
191/1 R
6,672,441 B1   1/2004 Uremovic
(Continued)

FOREIGN PATENT DOCUMENTS

CN    200942715 Y    9/2007
CN    101985285 A    3/2011
(Continued)

*Primary Examiner* — Jason C Smith
(74) *Attorney, Agent, or Firm* — Volpe Koenig

(57) ABSTRACT

A railway transportation power supply construction comprising a power supply rail and a return current rail respectively secured on two sides of an insulating base and isolated by the insulating base. A power supply arm and a return current arm are mounted to a bogie of a vehicle and insulated from the vehicle body by means of insulation rings, the bogie provided with a drive mechanism. The power supply arm has a front end connected to one end of an input port of the drive mechanism, and a terminal end in contact with the power supply rail. The return current arm has a front end connected to the other end of the input port of the drive mechanism, and a terminal end in contact with the return current rail. During operation, the power supply arm has friction with the power supply rail to be powered, and the return current arm has friction with the return current rail, enabling the vehicle to travel through a junction section with uninterrupted power supply while the structure and operating condition of a junction remain unchanged.

8 Claims, 2 Drawing Sheets

(56) References Cited

U.S. PATENT DOCUMENTS

| | | | |
|---|---|---|---|
| 9,321,372 B2* | 4/2016 | Kanemori | B60M 1/307 |
| 9,868,365 B2* | 1/2018 | Hourtane | B60M 1/36 |
| 2004/0020733 A1 | 2/2004 | Shook | |
| 2019/0106150 A1* | 4/2019 | Li | B62D 13/00 |
| 2020/0139848 A1* | 5/2020 | Li | B60L 5/36 |

FOREIGN PATENT DOCUMENTS

| | | |
|---|---|---|
| CN | 201824902 U | 5/2011 |
| CN | 201841973 U | 5/2011 |
| CN | 103052531 A | 4/2013 |
| CN | 203032414 U | 7/2013 |
| CN | 203126556 U | 8/2013 |
| CN | 104670045 A | 6/2015 |
| CN | 105857118 A | 8/2016 |
| CN | 205632171 U | 10/2016 |
| GB | 190912937 A | 6/1910 |
| JP | S5082699 U | 7/1975 |
| JP | S5481507 U | 6/1979 |
| JP | 55119531 A | 9/1980 |
| JP | 357030625 A | 2/1982 |
| WO | 2017174001 A1 | 10/2017 |

* cited by examiner

RAILWAY TRANSPORTATION POWER SUPPLY CONSTRUCTION

CROSS REFERENCE TO RELATED APPLICATIONS

This application is a 35 USC 371 national stage application of PCT/CN2017/079562, which was filed Apr. 6, 2017 and claimed priority to CN 201610213944.6, which was filed Apr. 7, 2016, both of which are incorporated herein by reference as if fully set forth.

FIELD OF THE INVENTION

The present invention relates to railway transportation power supply, in particular to a railway transportation power supply construction.

BACKGROUND OF THE INVENTION

At present, the electric traction network adopts the form of "overhead contact network+running rail" for the electrification railway systems and adopts the form of "overhead contact net+running rail" or "contact rail+running rail" for the urban rail transit systems such as subway, light rail, etc. All these forms of electric traction network use the running rail as the return rail of the traction current. Due to technical or economic factors, the running rail is not completely insulated from the earth. Therefore, the traction current will leak and spread to the earth through the running rail to form stray current, also called turbulent current. In particular, the urban rail transit systems employ DC (direct current) traction, the stray current generated by which causes electrochemical corrosion to the reinforcement structure of the track bed, the reinforcement structure inside the tunnel and the metal pipelines along the line, thus affecting the safety and service life of these structures and metal facilities. In this regard, stray current corrosion protection measures such as drainage protection, running rail resistance reduction, stray current collection and pipeline coating are adopted. There is a large capital investment, but the stray current and its long-term corrosion effects cannot be fundamentally eliminated. At the same time, the potential difference generated by return current of the running rail forms a step voltage, which may threaten personal safety and necessary precautions must be taken.

In addition, the electric traction network in form of the "overhead contact network+running rail" or "the contact rail+running rail" occupies a large space, and it is necessary to increase the tunnel cross section, thereby increasing the construction difficulty and cost.

Therefore, there is a need for a power supply construction that is compact, easy to operate, economical and practical, and capable of completely eliminating stray current and step voltage to protect personal and equipment safety while improving power supply reliability, extending the equipment life and facilitating daily maintenance.

SUMMARY OF THE INVENTION

The object of the present invention is to provide a railway transportation power supply construction, which can effectively solve the problem that the electric traction network additionally occupies the railway space and that the stray current and step voltage harm the personal and equipment safety.

To achieve the object, the present invention provides a railway transportation power supply construction continuously laid along the extending direction of the track bed, comprising an insulating base, a power supply rail, a return current rail and an insulating shield, wherein an upper portion of the insulating base is provided with a boss, with the power supply rail and the return current rail being respectively arranged on two side shoulders of the boss, and wherein the insulating shield is arranged on the top of the boss of the insulating base, the insulating shield covering the power supply rail and the return current rail.

The resent invention also provides a railway transportation power supply construction comprising a power supply arm and a return current arm, the power supply arm and return current arm are coupled with a bogie of a vehicle, the bogie is provided with a drive mechanism; wherein the power supply arm has a front end connected to one end of an input port of the drive mechanism, and a terminal end in contact with the power supply rail of the railway transportation power supply construction described above;

the return current arm has a front end connected to the other end of the input port of the drive mechanism, and a terminal end in contact with the return current rail of the railway transportation power supply construction described above;

The power supply rail, the power supply arm, the drive mechanism of the vehicle, the return current arm and the return current rail form a power supply loop for the vehicle.

The power supply arm and the return current arm are coupled with the bogie provided with the drive mechanism by means of insulation rings.

On another bogie adjacent to the bogie provided with the power supply arm and the return current arm, an auxiliary power supply arm and an auxiliary return current arm are provided. The auxiliary power supply arm and the power supply arm are connected by an auxiliary power supply cable, and the auxiliary return current arm and the return current arm are connected by an auxiliary return current cable. The auxiliary power supply cable and the auxiliary return current cable have the same interval length, that is, the distance between the auxiliary power supply arm and the power supply arm is equal to the distance between the auxiliary return current arm and the return current arm and larger than the length of a junction section, that is, the distance between the auxiliary power supply arm and the power supply arm is larger than the length of a junction section, and the distance between the auxiliary return current arm and the return current arm is larger than the length of a junction section.

The power supply rail and the return current rail must be installed higher than the top of a running rail.

The power supply rail, the return current rail and the insulating base are interrupted in the junction section, and the interrupted power supply rail and the return current rail are respectively connected through a power supply cable and a return current cable, and the length for which the power supply rail and the return current rail are interrupted is greater than or equal to the length of the junction section. The power supply arm and the return current arm are mounted to the bogie provided with the drive mechanism by means of insulation rings, and the auxiliary power supply arm and the auxiliary return current arm are mounted to the another bogie adjacent to the bogie provided with the drive mechanism by means of insulating rings, so that they may maintain a constant distance from the running rail during operation, keep good contact with and receive power from the power supply rail and the return current rail, and are insulated from the vehicle body.

In the junction section, the following technology can be adopted: the auxiliary power supply arm and the power supply arm are connected through the auxiliary power supply cable, and the auxiliary return current arm and the return current arm are connected through the auxiliary return current cable. The distance between the auxiliary power supply arm and the power supply arm is equal to the distance between the auxiliary return current arm and the return current arm and larger than the length of the junction section. The power supply rail and the return current rail must be installed higher than the top of the running rail. The power supply rail and the return current rail are interrupted in the junction section without affecting the structure and operating condition of a junction, and are respectively connected through the power supply cable and the return current cable. The power supply arm, the auxiliary power supply arm, the return current arm, and the auxiliary current arm pass above the junction of the running rail to form an interchange without affecting each other. In this way, the continuity of the power supply is maintained.

The insulating base and the insulating shield have certain rigidity and plasticity, and are generally preferred to use glass steel. The rigidity of the insulating base should be sufficient to support the power supply rail and the return current rail as well as the pressure resulted from the power supply arm and the return current arm in friction with the power supply rail and the return current rail. The insulating shield also has a certain rigidity to withstand the rolling of the vehicle in emergencies. With the plasticity of the insulating base and the insulating shield, the power supply rail and the return current rail can be embedded in the joint of the insulating base and the insulating shield. The insulating rings are only used for insulation and may be made of rubber, resin and the like.

The principle of the invention is to combine the rigidity, plasticity and insulation of the insulating base and the insulating shield with the mounting structure of the power supply rail and the return current rail to construct a power supply loop that is compact, simple, independent, insulated from the running rail and track bed and does not occupy the external space of the vehicle. By utilizing the insulation properties of the insulating base and the insulating shield and the compactness of the arrangement of the power supply rail and the return current rail, the power supply voltage level and the system power supply capability can be improved within the same space, and the cable effect can be formed under the AC (alternating current) power supply system. At the same time, the wiring and interchanging technologies enable the vehicle to travel through a junction section with uninterrupted power supply while the structure and operating condition of a junction remain unchanged.

As compared with the prior art, the present invention has the advantageous effects explained below:

1) The present invention is insulated from the running rail of the vehicle to form an independent traction power supply loop, which does not generate stray current and ground step voltage, and protects the safety of the person and the facility.

2) The arrangement of the insulating base and the insulating shield allows the present invention to increase the supply voltage level and the system power supply capability within the same space, and to form a cable effect under the AC power supply system. As compared with the current form of "overhead contact network+running rail" or "contact rail+running rail", the present invention provides a stronger power supply capability under the same voltage level.

3) The arrangement of the insulating base and the insulating shield can effectively avoid the short circuit fault of the power supply rail and the return current rail, and improve the reliability of the power supply.

4) The present invention is of low cost and can effectively utilize the space between the running rails and the bottom of the vehicle. It does not occupy additional space, does not increase the civil engineering cost, and is economical and practical.

5) The present invention allows the vehicle to travel through the junction section with uninterrupted power supply while the structure and operating condition of the junction remain unchanged.

6) The present invention does not adversely affect the urban landscape when it is operating on the ground.

7) The present invention has the advantages of compact structure, simple installation, convenient maintenance, safety and reliability, and long service life, and is suitable for both building new railway lines and modifying existing lines.

DESCRIPTION OF THE DRAWINGS

To more clearly illustrate the technical solutions in the embodiments of the present invention, the drawings used in the description of the embodiments will be briefly described below. It is obvious that the drawings in the following description are only some embodiments of the present invention. For those skilled in the art, other drawings can be obtained according to these drawings without any creative work. In these drawings.

DETAILED DESCRIPTION OF THE EMBODIMENTS

The embodiments of the present invention will be further described in detail below with reference to the accompanying drawings. The illustrative embodiments of the present invention and the description thereof are intended to explain the present invention, but are not intended to limit the invention.

The invention is further described below in conjunction with the drawings and specific embodiments.

Embodiments

Figure 1:
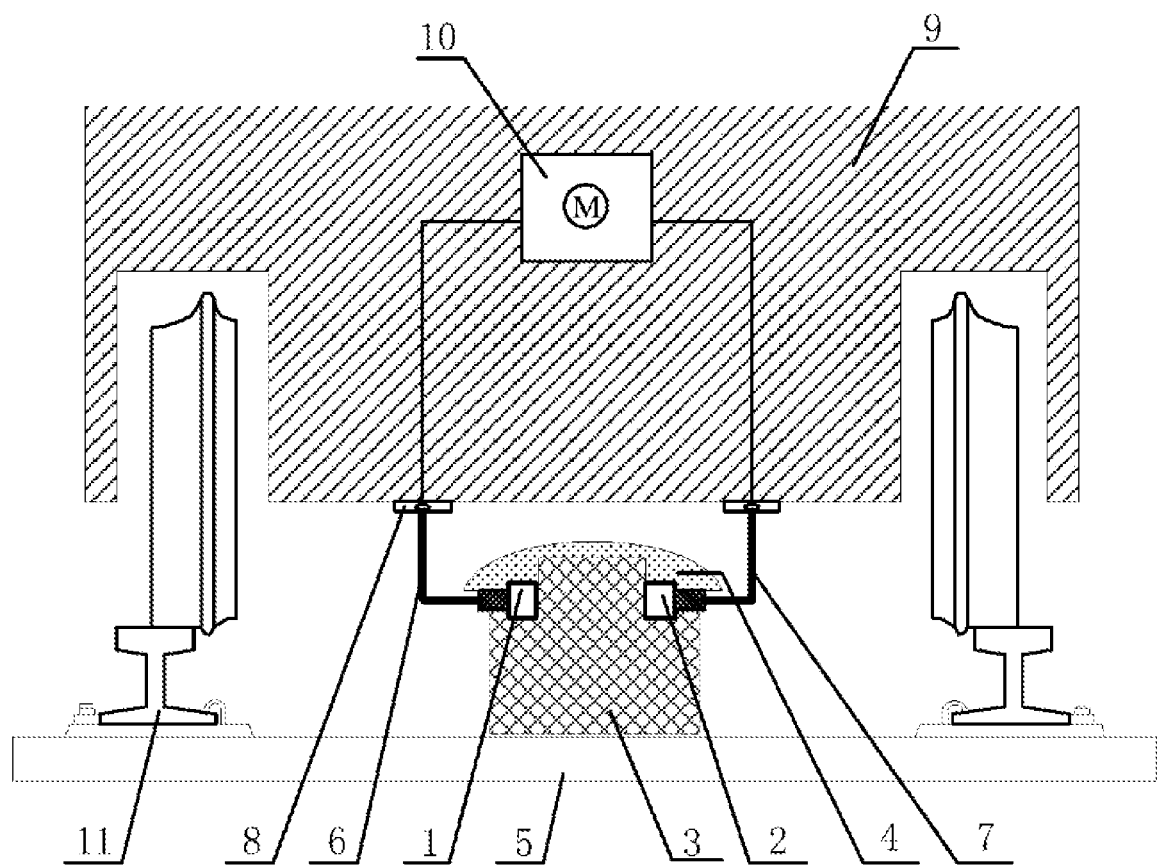
FIG. 1 is a schematic diagram illustrating the cross-section of a railway transportation power supply construction according to an embodiment of the present invention.

FIG. 1 illustrates a railway transportation power supply construction, in which a power supply belt consisting of a power supply rail 1, a return current rail 2, an insulating base 3 and an insulating shield 4 continuously laid along the extending direction of the track bed 5; the upper portion of the insulating base 3 is provided with a boss, with the power supply rail 1 and the return current rail 2 being respectively arranged on two side shoulders of the boss, the boss isolates the power supply rail 1 and the return current rail 2, and the insulating shield 4 is arranged on the top of the boss of the insulating base 3. The present invention further provides a railway transportation power supply construction comprising a power supply arm 6 and a return current arm 7, the power supply arm 6 and return current arm 7 are coupled with a bogie 12 of a vehicle 9 (i.e., bullet train) by means of an insulating ring 8, the bogie 12 is provided with a drive mechanism 10. More specifically, the power supply arm 6 and the return current arm 7 are coupled with a front bogie of the vehicle. The power supply arm 6 has a front end connected to one end of an input port of the drive mechanism 10, and a terminal end in contact with the power supply rail 1. The return current arm 7 has a front end connected to the other end of the input port of the drive mechanism 10, and a terminal end in contact with the return current rail 2. The power supply rail 1, the power supply arm 6, the drive mechanism 10, the return current arm 7 and the return current rail 2 form a traction power supply loop for the vehicle. The power supply rail 1 and the return current rail 2 must be installed higher than the top of a running rail 11. The insulating base 3 and the insulating shield 4 have certain rigidity and plasticity, and are generally preferred to use glass steel. The rigidity of the insulating base 3 should be sufficient to support the power supply rail 1 and the return current rail 2 as well as the pressure resulted from the power supply arm 7 and the return current arm 7 in friction with the power supply rail 1 and the return current rail 2. The insulating shield 4 also has a certain rigidity to withstand the rolling of the vehicle in emergencies. With the plasticity of the insulating base 3 and the insulating shield 4, the power supply rail 1 and the return current rail 2 can be embedded in the joint of the insulating base 3 and the insulating shield 4. The insulating rings 8 are only used for insulation and may be made of rubber, resin and the like.

Figure 2:
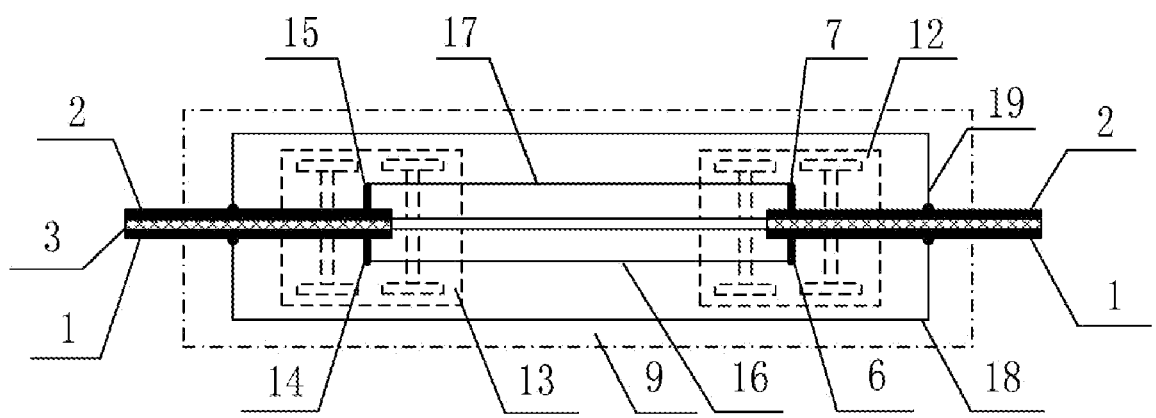
FIG. 2 is a schematic diagram illustrating the railway transportation power supply construction in a junction section according to an embodiment of the present invention.

FIG. 2 illustrates a junction section according to the present invention. As can be seen, on another bogie 13 (e.g. a rear bogie) adjacent to the bogie 12 (e.g. a front bogie) provided with the power supply arm 6 and the return current arm 7, an auxiliary power supply arm 14 and an auxiliary return current arm 15 are provided. The auxiliary power supply arm 14 and the power supply arm 6 are connected by an auxiliary power supply cable 16, and the auxiliary return current arm 15 and the return current arm 7 are connected by an auxiliary return current cable 17. The auxiliary power supply cable and the auxiliary return current cable have the same interval length, and the interval length is larger than the length of the junction section.

In the junction section, the following technology can be adopted: in the junction section, the power supply rail 1, the return current rail 2 and the insulating base 3 are interrupted in the junction section. The interrupted power supply rail 1 and the return current rail 2 are respectively connected through a power supply cable 18 and a return current cable 19. The length for which the power supply rail and the return current rail are interrupted is greater than or equal to the length of the junction section. The power supply arm 6 and the return current arm 7 are mounted to the bogie provided with the drive mechanism 10 of the vehicle by means of insulation rings 8, and the auxiliary power supply arm 14 and the auxiliary return current arm 15 are mounted to the another bogie adjacent to the bogie provided with the drive mechanism by means of insulating rings 8, so that they maintain a constant distance from the running rail during operation, keep good contact with and receive power from the power supply rail 1 and the return current rail 2, and are insulated from the vehicle body. The auxiliary power supply arm 14 and the power supply arm 6 are connected by an auxiliary power supply cable 16, and the auxiliary return current arm 16 and the return current arm 7 are connected by an auxiliary return current cable 17. The auxiliary power supply cable and the auxiliary return current cable have the same interval length, and the interval length is larger than the length of the junction section. The power supply rail 1 and the return current rail 2 must be installed higher than the top of the running rail. The power supply rail 1 and the return current rail 2 are interrupted in the junction section without affecting the structure and operating condition of a junction and are respectively connected through the power supply cable 18 and the return current cable 19. The power supply arm 6, the auxiliary power supply arm 14, the return current arm 7, and the auxiliary current arm 15 pass above the junction of the running rail 11 to form an interchange without affecting each other. In this way, the continuity of the power supply is maintained.

The insulating base 3 and the insulating shield 4 are made of materials having good insulation properties and high dielectric constant, which is beneficial to improve the supply voltage level and power supply capability. At the same time, the power supply rail and the return current rail are compactly arranged to form cable effect under the AC power supply system. As compared to the current form of "overhead contact network+running rail" or "contact rail+running rail", a stronger power supply capability can be achieved under the same voltage level.

The following describes the process during which the vehicle passes through the junction section with uninterrupted power supply.

When the vehicle does not reach the junction section, both the power supply arm 6 and the auxiliary power supply arm 14 have friction with the power supply rail 1 to be powered, and both the auxiliary return current arm 15 and the return current arm 7 have friction with the return current rail 2 to be powered. The power supply rail 1, the power supply arm 6 and the auxiliary power supply arm 14, the drive mechanism 10 of the vehicle 9, the return current arm 7 and the auxiliary return current arm 15, and the return current rail 2 form a power supply loop for the vehicle 9.

When the vehicle passes through the junction section, the power supply arm 6 and the return current arm 7 are not powered in the interrupted junction section and do not supply power to the vehicle. The distance between the power supply arm 6 and the auxiliary power supply arm 14 is greater than the length of the interrupted junction section and the distance between the return current arm 7 and the auxiliary return current arm 15 is greater than the length of the interrupted junction section, therefore, the auxiliary power supply arm 14 is in contact with the power supply rail 1 and the auxiliary return current arm 15 is contact with the return current arm 2. The power supply loop formed of the power supply rail 1, the auxiliary power supply arm 14, the auxiliary power supply cable 16, the drive mechanism 10 of the vehicle, the auxiliary return current cable 17, the auxiliary return current arm 15, and the return current rail 2 supplies power to the drive mechanism 10 of the vehicle 9. Similarly, the power supply rail 6 is put into contact with and powered by the power supply rail 1 again after passing through the interrupted junction section, and the return current arm 7 is put into contact with and powered by the return current rail 2 again after passing through the interrupted junction section. The power supply loop of the vehicle formed of the power supply rail 1, the power supply arm tithe drive mechanism 10 of the vehicle, the return current arm 7, and the return current rail 2 supplies power to the drive mechanism 10. At this time, the auxiliary power supply arm 14 and the auxiliary return arm 15 pass through the interrupted junction section and are not powered.

In the non-junction section, the power supply arm 6 and the return current arm 7 work in parallel with the auxiliary power supply arm 14 and the auxiliary return current arm 15 to supply power to the vehicle 9.

The objects, technical solutions and advantageous effects of the present invention are further described in detail in the specific embodiments described above. It should be understood that the foregoing description is only illustrative of specific embodiments of the invention, and is not intended to limit the scope of the invention. Any modifications, equivalents, improvements, etc. within the spirit and scope of the invention should be included in the scope of protection of the present invention.

The invention claimed is:

1. A railway transportation power supply construction, which continuously laid along the extending direction of the track bed, wherein the railway transportation power supply construction comprising an insulating base, a power supply rail, a return current rail and an insulating shield, wherein an upper portion of the insulating base is provided with a boss, with the power supply rail and the return current rail being respectively arranged on two side shoulders of the boss, and the insulating shield is arranged on the top of the boss of the insulating base, the insulating shield covering the power supply rail and the return current rail.

2. The railway transportation power supply construction according to claim 1, wherein the insulating base is a glass steel insulating base, and/or the insulating shield is a glass steel insulating shield.

3. The railway transportation power supply construction according to claim 1, wherein the power supply rail and the return current rail are installed higher than a running rail.

4. The railway transportation power supply construction according to claim 1, wherein the power supply rail, the return rail, the insulating base and the insulating shield are interrupted in a junction section, and wherein the interrupted power supply rail is connected through a power supply cable, and the interrupted return current rail is connected through a return current cable.

5. A railway transportation power supply construction comprising a power supply arm and a return current arm, the power supply arm and the return current arm are coupled with a bogie of a vehicle, the bogie is provided with a drive mechanism, wherein the power supply arm has a front end connected to one end of an input port of the drive mechanism of the vehicle, and a terminal end in contact with the power supply rail of the railway transportation power supply construction according to claim 1;

the return current arm has a front end connected to the other end of an input port of the drive mechanism of the vehicle, and a terminal end in contact with the return current rail of the railway transportation power supply construction according to claim 1;

the power supply rail, the power supply arm, the drive mechanism of the vehicle, the return current arm and the return current rail form a power supply loop for the vehicle.

6. The railway transportation power supply construction according to claim 5, wherein the power supply arm and the return current arm are coupled with the bogie provided with the drive mechanism by means of an insulation ring.

7. The railway transportation power supply construction according to claim 6, wherein the insulation ring is a rubber insulation ring.

8. The railway transportation power supply construction according to claim 5, wherein an auxiliary power supply arm and an auxiliary return current arm are provided on an bogie adjacent to the bogie provided with the power supply arm and the return current arm, wherein the auxiliary power supply arm and the power supply arm are connected by an auxiliary power supply cable, and the auxiliary return current arm and the return current arm are connected by an auxiliary return current cable;

the auxiliary power supply arm is in contact with the power supply rail, and the auxiliary return current arm is in contact with the return current rail;

the distance between the auxiliary power supply arm and the power supply arm is larger than the length of the junction section, and the distance between the auxiliary return current arm and the return current arm is larger than the length of the junction section.

* * * * *